Figure 1:
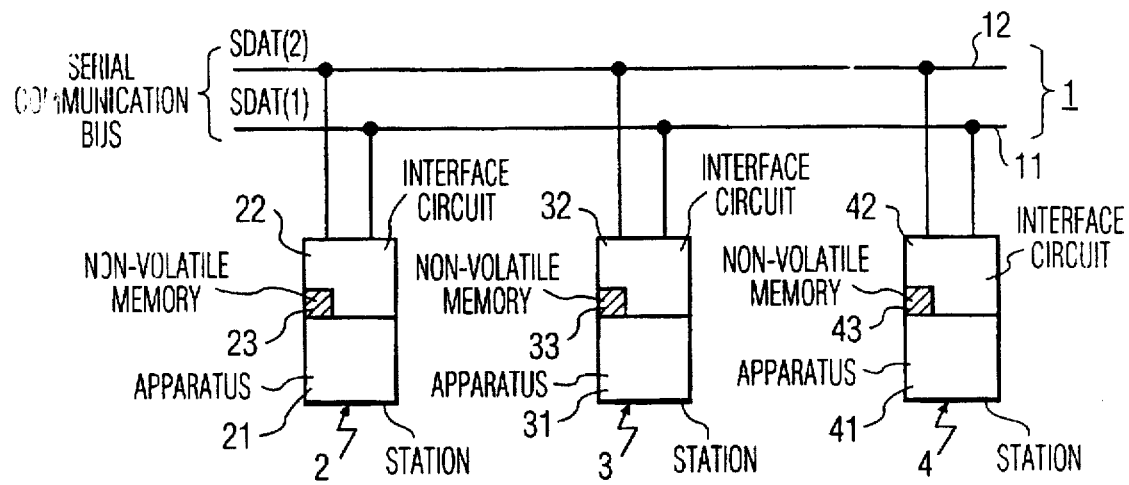

United States Patent [19]
Wilson

[11] Patent Number: 5,712,852
[45] Date of Patent: Jan. 27, 1998

[54] D2B DEVICE STATION ADDRESS INITIALIZATION STARTING WITH STORED ADDRESS

[75] Inventor: Neil A. Wilson, Weybridge, United Kingdom

[73] Assignee: DB2 Systems Company Limited, Redhill, Great Britain

[21] Appl. No.: 374,680

[22] PCT Filed: Jun. 24, 1994

[86] PCT No.: PCT/IB94/00174

§ 371 Date: Jan. 25, 1995

§ 102(e) Date: Jan. 25, 1995

[87] PCT Pub. No.: WO95/01026

PCT Pub. Date: Jan. 5, 1995

[30] Foreign Application Priority Data

Jun. 25, 1993 [EP] European Pat. Off. ............ 93201840

[51] Int. Cl.$^6$ ................................................. H04L 12/403
[52] U.S. Cl. .......................... 370/451; 370/457; 370/489; 395/281; 395/421.01
[58] Field of Search ...................... 370/85.1, 85.5, 370/85.11, 85.4, 85.9, 85.2, 85.7, 457, 447, 449, 450, 451, 452, 454, 455, 442, 489, 485; 395/200.02, 287, 200.16, 281, 200.1, 421.01; 365/189.02

[56] References Cited

U.S. PATENT DOCUMENTS

| 4,429,384 | 1/1984 | Kaplinsky | 370/442 |
| 4,661,902 | 4/1987 | Hochsprung et al. | 395/800 |
| 5,150,464 | 9/1992 | Sidhu et al. | 395/200.1 |

FOREIGN PATENT DOCUMENTS

| 0537814 | 4/1993 | European Pat. Off. | H04L 29/06 |
| 8900717 | 3/1989 | Netherlands | H04B 3/50 |
| 8900717 | 10/1990 | Netherlands | . |
| 0 537814A1 | 9/1991 | Netherlands | H04L 29/06 |

OTHER PUBLICATIONS

MAB 5051—Single Chip Microcontrollers; User Manual 1988, Philips Electronic Components and Materials, Chapters 3 and 11.

Primary Examiner—Wellington Chin
Assistant Examiner—Melissa Kay Carman
Attorney, Agent, or Firm—Anne E. Barschall

[57] ABSTRACT

A single channel communication bus system has stations which communicate with each other via the bus. Each station must have a unique address which is initialized during a system initialization. In order to facilitate initialization, a manufacturer-determined address is stored in a non-volatile memory. Search for a unique address for each station begins with the address stored in the non-volatile memory.

7 Claims, 3 Drawing Sheets

D2B DEVICE STATION ADDRESS INITIALIZATION STARTING WITH STORED ADDRESS

The invention relates to a single channel communication bus system. The system includes a communication bus having a plurality of stations connected to it. The stations can communicate with one another via the communication bus. Each station has a unique station address assigned. The stations include an interface circuit which is adapted to call any destination station by generating a destination station address of said destination station. The interface circuit is also adapted to receive an acknowledge signal which is transmitted by the relevant destination station if the station address of said destination station corresponds to the transmitted destination station address. The interface circuit of a station is further adapted to perform an initialisation program under the control of which the interface circuit is able to generate and transmit a plurality of different destination station addresses in a determined sequence. Such generation and transmission are discontinued upon absence of an acknowledge signal. The destination station address that is the last that has been generated and transmitted is assigned as the master station address to said station.

Such a single channel communication bus system is known from the Dutch patent application No. 8900717 which has been published on Oct. 16, 1990. In said patent application has been described how a new device or station is added to the bus system. When the station has been switched on, a software protocol in said station will initialize the procedure to find a unique address for said station. The station address initialisation involves in fact two steps. A first one is choosing an address and the second one is verifying whether that address is unique. In order to find out whether said address is unique, the added station sends a chosen address on the bus to all other stations which are connected to the bus system. Each station which has already been active in the bus system checks whether the address sent by the newly added station corresponds with its own address or not. In the first situation the station that identifies the address sent by the newly added device as its own, will send back to the newly added station an acknowledge signal. So, if the newly added station receives an acknowledge signal it can verify that the address chosen by it previously is not unique. As a result in a second cycle the newly added station will choose another address different from the first chosen one and the protocol as described hereinbefore is repeated up to the moment where no acknowledge signal will be received by the newly added station. This means that there is no station having this address chosen by the newly added station and thus this address is unique. As soon as this situation occurs the newly added station will adopt this unique address as its own.

The above described station address initialisation can be used in a D2B system, which for instance has been described in U.S. Pat. No. 4,429,384. From the description of the D2B system in this U.S. Pat. No. 4,429,384 can be deduced that the D2B should perform in a reliable way in a low cost and possible noisy environment. Experience has shown that signals on buses sometimes deteriorate which as a consequence means that the above initialisation procedure can be ruined. Some station on the bus system may sent an acknowledge signal to inform the newly added station that the address send by it is not unique, but if such acknowledge signal is deteriorated then the newly added station will adopt said address as its own, but said address is not unique. As a result communication between these two stations and other stations will be disastrous, because if one of the two stations is addressed by another station both stations will respond and mostly in different ways because each station might be a totally difference type of device. Also in this case no proper initialisation will take place.

Further the Dutch patent application 8900717 discloses that the message including the destination address also comprises the address of the master station to be initialized, thereby the destination station address and the master station address are the same. In practice it has become clear that use of the same address for the master station and the destination station is problematic, because the receiving part of the master station might read the destination station address and consequently would control the transmitting part of the master station to send an acknowledge signal to itself.

It is the object of the invention to provide a communication bus system wherein the above described problems are mitigated and address initialisation is carried in a robust reliable noise insensitive way.

Therefore the single channel communication bus system is characterized in that each station has a non volatile memory for storing the address assigned to said station, whereby upon start of the initialisation program the generation and transmission of the different destination station addresses starting with the address stored previously in said non volatile memory. It has been found in practice that use of the address stored previously in said non-volatile memory as a start address in the initialisation procedure the number of attempts to find a unique address is substantially reduced. This reduction is even more drastic if the configuration, i.e. the stations connected to the bus, has not been changed.

An embodiment of the invention is characterized in that the station before sending a destination station address during the initialisation program adopts a default address which is forbidden to be used by any station operating after initialisation in the bus system. Upon start of the initialisation procedure the master station address is given a default address, which cannot be used under normal operation (i.c. after initialisation) by any of the other stations connected to the bus. As a consequence any station to be initialised will not react to its own transmitted messages. Upon determination of a unique address the default address will be replaced by the new found unique address.

Figure 2A:
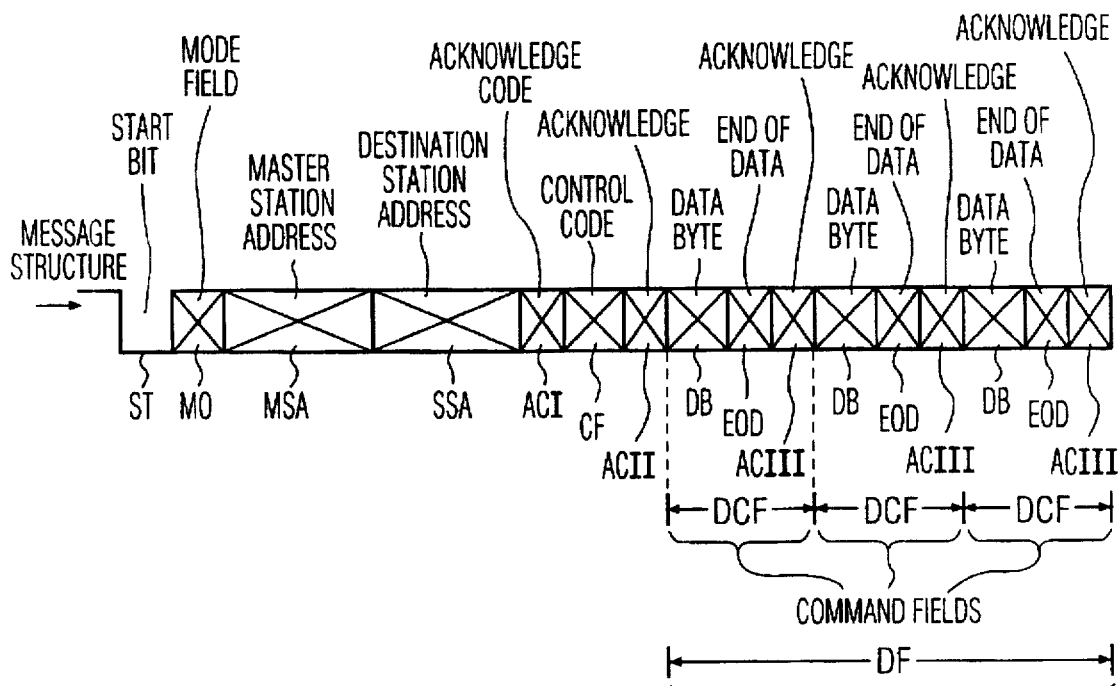
Figure 2B:
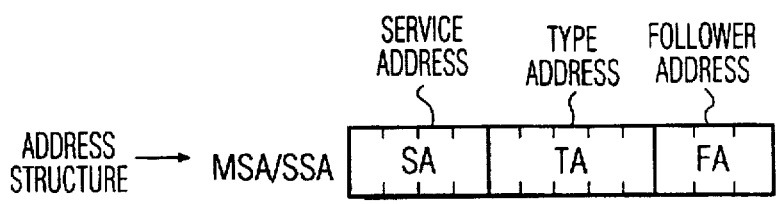
Figure 3:
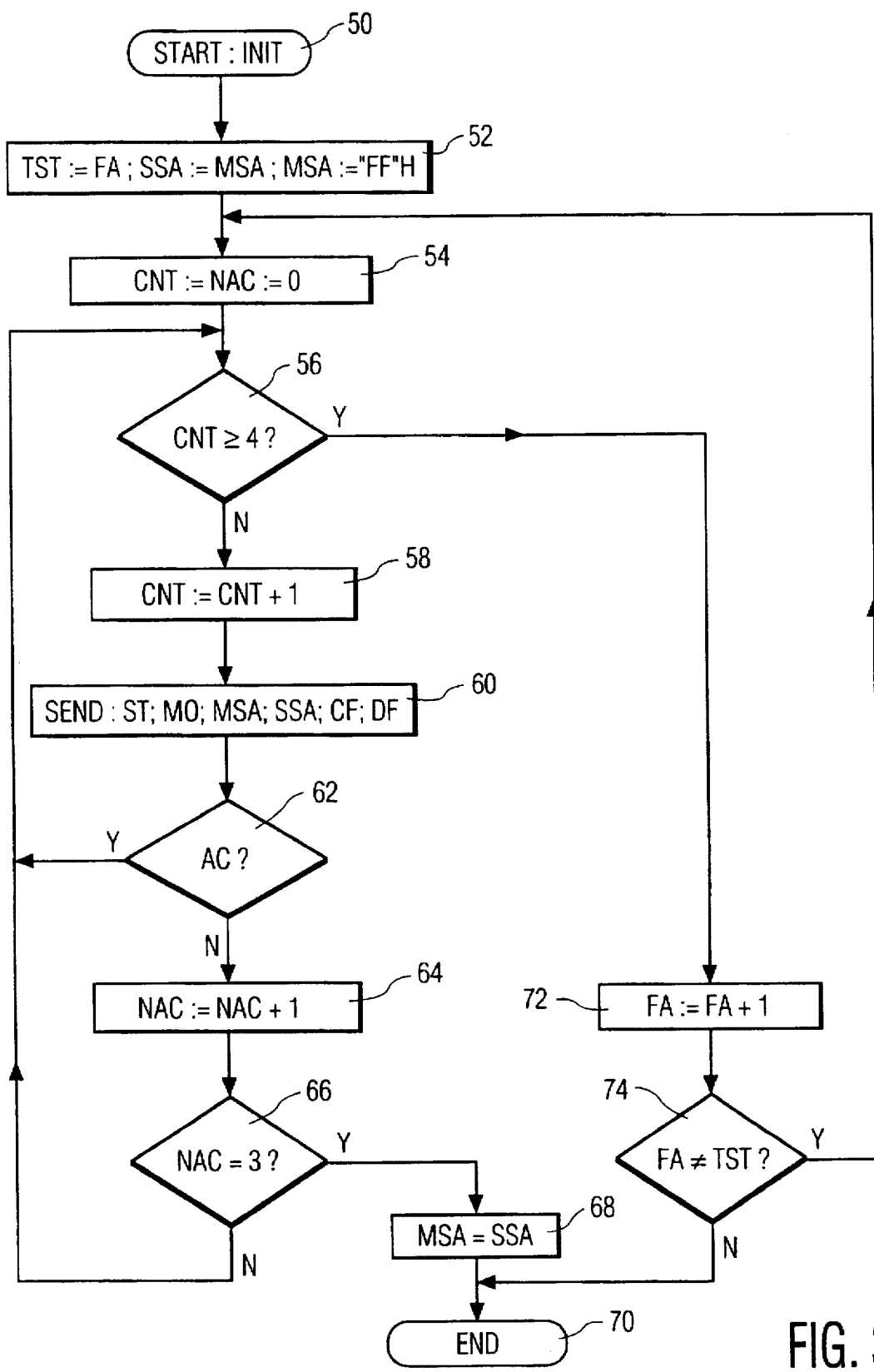

The invention will further be explained in detail by use of drawings and corresponding descriptions given herebelow, thereby in the drawings FIG. 1 shows diagrammatically the general structure of a single channel communication system, FIGS. 2A and 2B show diagrammatically the message structure as used on the communication bus, FIG. 3 shows a flow chart for determining the station address of a station in accordance with the invention.

Figure 4:
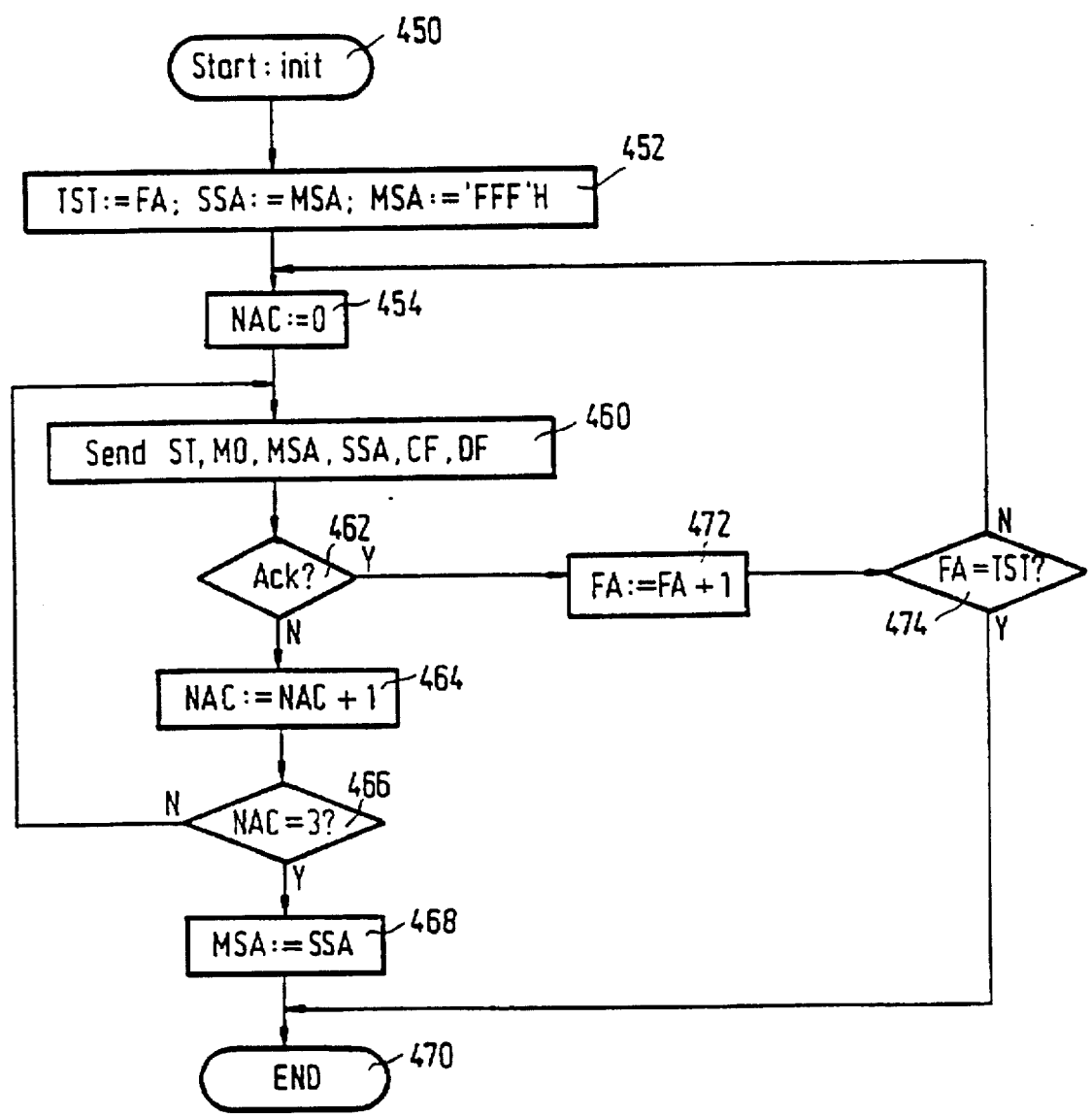

FIG. 4 shows initialization program.

E(1) General structure of the communication bus system.

FIG. 1 shows diagrammatically a single channel communication bus system. It comprises a serial communication bus 1 consisting of two data lines 11 and 12. In this case three stations 2, 3 and 4 are connected to this communication bus 1. Each station 2, 3 and 4 respectively comprises an apparatus 21, 31 and 41 respectively which is connected to the data lines 11 and 12 by means of an interface circuit 22, 32, 42. As already noted, such an apparatus may be a TV monitor, a video recorder, an audio recorder, an audio tuner, etc. The communication bus 1 is intended to transmit control signals from a first station to a second station. Any station may act as a master station and thereby all other stations act as destination stations. Some stations will act as transmitters of data, some act as receivers of data. Furthermore, all kinds of mixed or alternating situations are possible. The communication operations on the communication bus, which will herein be described, are performed by the interface circuits 22, 32 and 42. A so-called microcontroller MAB 5051 extensively described in chapter 3 of Single Chip Microcontrollers; User Manual 1988, Philips Electronic Components and Materials, for example, be used as an interface circuit. To be able to distinguish the different stations, each interface circuit has a programmable, non volatile memory 23, 33, 43 in which a station address is stored. A typical station address comprises twelve bits.

E(2) The message structure.

The general structure of a message structure on an information level, which structure is extensively described in Chapter 11 of the User Manual pointed out hereabove is denoted in FIG. 2A. Such a message structure starts with a start bit ST. It is followed by a mode field MO in which a number of so-called mode indication bits is transmitted. A typical number of mode indication bits is three. They indicate the rate at which the following information will be transmitted. In fact, a limited number of standardized transmitter frequencies has been defined. This mode field is followed by a master station address field MSA. In this field the twelve-bit master station address is transmitted from the station wishing to transmit information to a destination station. The twelve-bit destination station address is subsequently transmitted in the destination station address field SSA. If a station recognizes the destination station address, it transmits an acknowledge code in an acknowledge code field ACI. If this acknowledge code is not received, it means that the said destination station is not present or does not function or that the destination station address is received in a mutilated, non-recognizable form by the destination station. In these cases the communication may be discontinued each time after the acknowledge code field. If the destination station has transmitted an acknowledge code, the master station transmits a control code of, for example four bits in a control field CF. After reception of this control code, the destination station again transmits an acknowledge code in an acknowledge code field ACII. If this second acknowledge code is not received by the master station, the communication may be discontinued. If the master station has received this second acknowledge code, a data field DF will be sent. In this data field the master DF station transmits data to the destination station, or vice versa. The data field DF comprises one single or a plurality of command fields DCF. Each command field comprises one or more data bytes DB which represents the actual information, an EOD field (end-of-data) the end of the data byte(s) of a command field and/or indicating whether a further command field DCF II, DCF III follows this command field DCF I and an acknowledge code field ACIII in which the destination station indicates that the information has been received correctly. If no acknowledge code ACIII is received, this may mean that i) the actual information is mutilated due to transmission errors, ii) the destination station is switched off after the transmission of the control code, or iii) the destination station is not capable of receiving and buffering the data byte, for example because the processing of this information takes too long. In all these cases i.c. not receiving an acknowledge code AC the master station is set to its repetitive position for sending once again e.g. the whole message. Another possibility is to resend upon absence of an acknowledge code ACIII the relevant command field until the acknowledge code ACIII is ultimately received. If this command field is not the last field, the transmission will be continued by sending the next command field. If this field is the last field, the communication operation is terminated. Subsequently, a new communication operation can be started.

It is to be noted that parity bits are also transmitted in the different fields so as to protect the information from transmission errors.

E(3) The station address.

In FIG. 2B the general structure of a station address is shown. It comprises a service address SA, a type address TA and a follower address FA. The service address SA comprises, for example four bits and can thus distinguish sixteen services, for example an audio-video service, a washing service, a cooking/baking service etc. The type address TA comprises, for example five bits so that thirty-two stations can be distinguished within one service. For example, within the washing service a distinction can be made between a washing machine, a drier, a dish washer, etc. and within the audio-video service a distinction can be made between a TV-set, a TV-monitor, a tuner, a video recorder, etc.

It will often occur in practice that the user has a number of apparatuses of the same type, for example, two or more video recorders. The follower address FA enables him to distinguish between these apparatuses of the same type. This follower address comprises, for example three bits so that eight apparatuses of the same type can be distinguished.

E(4) The initialisation.

As already noted in the foregoing section, a station address comprises a service address SA, a type address TA and a follower address FA. Service address SA and type address TA have been assigned by manufacturers and in practice the manufacturer programs them in the station address memory (23,33,43) of the interface circuit 22, 32, 42. In practice, the follower address FA will be set to zero (or to 111) by the manufacturer and programming of the follower address FA will be done in use and thus does not take place until after the relevant apparatus has been connected to the communication bus 1 by means of the interface circuit. To this end this interface circuit has an initialisation program which comprises, for example the steps shown in FIG. 3 and which is performed as soon as the apparatus is switched on. More particularly after start of the initialisation START:INIT in step 50 the present follower address FA is used to set a test value TST in a second step 52 (TST:=FA). Further in said second step 52 the destination station address SSA is made equal to the present master station address MSA (of which the parts SA, TA are fixed and the part FA is to be found). Thereafter the master station address MSA is set to a default value e.g. "FFF"H, which means 1111 1111 1111 in hexadecimal notation. Further in a next step 54 a counter CNT and a not-acknowledge counter NAC are set to zero.

In a next program step 56 the counter CNT is checked whether its value is equal or greater than 4. Subsequently in step 58 the counter CNT is increased by one. Reason for this will be explained later on.

In the next program step 60 the start bit ST, the mode bits of the mode field MO subsequently the default station address MSA and finally the destination station address SSA of the destination station with which communication is desired are sent. Detection of receipt of absence of an acknowledge code takes place in a step 62. If no acknowledge is received code in the acknowledge code field ACI (so that ACI=0), then in a next step 64 the counter value NAC is raised by 1 (NAC:=NAC+1). Subsequent step 66 tests whether absence of an acknowledge bit has been detected three times. If so then in a next step 68 the master station address is set to the destination station address SSA including the then present follower address FA. The initialisation procedure will thereafter end in step 70.

However if in step 66 it is detected that the counter value NAC is less than three the procedure starts again at step 56. Each time the count value NAC will be increased unless in step 62 it is detected that an acknowledge bit has been received in the acknowledge code field ACI (so that ACI=1), the counter value CNT is tested in a step 56. If the counter value CNT is less than 4 the steps 58 to 66 are performed again. Whenever an acknowledge code occurs (ACI=1) this means that a station is connected to the communication bus which has the same service address, type address and follower address as the transmitting master station. When an acknowledge code has been received enough times, the counter value CNT will have the value of four, which means that one of the stations has definitely a station address which should not be used by this master station.

Therefore, after detection that the counter value CNT≧4 a step 72 is carried out, wherein the follower address FA is increased by one. In a next step 74 it is tested whether the follower address FA differs from the test value TST, if so then the initialisation procedure is started again by resetting the counter values CNT and NAC to zero in step 54. If the test value TST equals the follower address FA then all different positions of the latter have been used. If the follower address FA consists of three bits then after 8 trials with different values for FA the starting value TST will be reached due to the setting of TST equal to FA in step 52. In such a situation the initialisation procedure is aborted (END) in step 70 and said station cannot communicate via the bus 1.

In the above example four times a message will be sent on the bus and at maximum one failure i.e. acknowledge of a message will be accepted for permitting use of an address by an apparatus connected to the bus 1.

E(5) A further embodiment of the initialisation.

As already noted in the foregoing section, a station address comprises a service address SA, a type address TA and a follower address FA. Service address SA and type address TA have been assigned by manufacturers and in practice the manufacturer programs them in the station address memory (22,33,63) of the interface circuit 22, 32, 42. As said before the follower address FA will be set to zero (or to 111) by the manufacturer and programming of the follower address FA will be done in use and thus does not take place until after the relevant apparatus has been connected to the communication bus 1 by means of the interface circuit. The further embodiment of an initialisation program comprises, for example the steps shown in FIG. 4, which are performed as soon as the apparatus is switched on. More particularly after start of the initialisation START:INIT in step 450 the present follower address FA is used to set a test value TST in second step 452 (TST:=FA). Further in said second step 452 the destination station address SSA is made equal to the present master station address MSA (of which the parts SA, TA are fixed and the part FA is to be found). Thereafter the master station address MSA is set to a default value e.g. "FFF"H, which mean 1111 1111 1111 in hexadecimal notation. Further in a next step 454 a not-acknowledge counter NAC are set to zero.

In the next program step 460 the start bit ST, the mode bits of the mode field MO, subsequently the default station address MSA and finally the destination station address SSA of the destination station, with which communication is desired, are sent. Detection of receipt of absence of an acknowledge code takes place in a step 462. If no acknowledge code is received in the acknowledge code field ACI (so that ACI=0), then in a next step 464 the counter value NAC is raised by 1 (NAC:=NAC+1). In the subsequent step 466 it is tested whether absence of an acknowledge bit has been detected three times. If so then in a next step 468 the master station address is set to the destination station address SSA including the then present follower address FA. The initialisation procedure will thereafter end in step 70.

However if in step 466 it is detected that the counter value NAC is less than three the procedure starts again at step 460. Each time the count value NAC will be increased unless in step 462 it is detected that an acknowledge bit has been received in the acknowledge code field ACI (so that ACI=1). Whenever an acknowledge code occurs (ACI=1) =1) this means that a station is connected to the communication bus which has the same service address SA, type address TA and follower address FA as the transmitting master station.

Therefore, the follower address FA is increased by one, in step 472 (FA:=FA+1). In a next step 74 it is tested whether the follower address FA differs from the test value TST, if so then the initialisation procedure is started again by setting the counter value NAC to zero in step 454. If the test value TST equals the follower address FA then all different positions of the latter have been used. If the follower address FA consists of three bits then after 8 trials with different values for FA the starting value TST will be reached due to the setting of TST equal to FA in step 452. In such a situation the initialisation procedure is aborted (END) in step 470 and said station cannot communicate via the bus 1.

Of course different possibilities exist for finding unique addresses for the stations (by use of majority votes). The above given examples shall by no means limit the scope of the invention, which apart from test values to be used or of efficiency of the initialisation program does not make any influence on the invention as such.

In the situation that a station has address setting means to be controlled by the user e.g. a switch for setting the address of a VCR to VCR-1 or VCR-2 the flow charts as shown in FIG. 3 and FIG. 4 can be simplified substantially. The steps 72 and 74 or 472 and 474 can be dispensed with and thus the variable item TST can be dispensed with too (see step 52 and 452). At the end in step 70 or 470 the master station address will be the default address "FFF", which should be signalled to the user via e.g. a display. The user then can throw a switch in order to change from one preset address of the station (VCR-1) to the second preset address of the station (VCR-2). If this second address is acknowledged in a succeeding initialization procedure, which is triggered by the user by e.g. switching power off and on again, then again the master station address is set to the default address "FFF". If the user does not interfere anymore then the station continues to operate with the default address.

I claim:

1. A single channel communication bus system comprising
   a. a communication bus
   b. a plurality of stations connected to the communication bus, which plurality of stations can communicate with one another via the communication bus, each respective one of the plurality of stations requiring a respective unique station address and including
      i. a respective interface circuit for
         A. calling a destination station, from amongst the plurality of stations, by generating and transmitting a destination station address of said destination station, B. for receiving an acknowledge signal that is transmitted by said destination station if the respective unique station address of said destination station corresponds to the transmitted destination address, C. performing an initialisation program under the control of which the interface circuit α. generates and transmits at least one of a plurality of different destination addresses according to a predetermined sequence, starting from a start value β. discontinues said generation and transmission of the at least one of the plurality of different destination station addresses, upon absence of an acknowledge signal, γ. assigns, as the respective unique station address of the respective one of the plurality of stations, a last one of at least one of the plurality of different destination station addresses, which is the last that was generated and transmitted, and δ. stores the respective unique station address in a non-volatile fashion for use as a next start value in a future initialisation, and ii. a respective non volatile memory for storing the start value and next start value as the respective unique address of the respective one of the plurality of stations, such that upon start of the initialisation program, the generation and transmission of the at least one of the plurality of different destination station addresses starts with the start value without added bits.

2. A single channel communication bus system as claimed in claim 1, wherein at least one of the plurality of stations, before transmitting the at least one of the plurality of different destination station addresses in the initialisation program, adopts a default address that is forbidden to be used by any station except during initialisation in the bus system.

3. A single channel communication bus system as claimed in claim 1, wherein each of the plurality of destination addresses comprises a fixed part which depends on the type of station and a variable part which comprises a fixed number of bits.

4. A single channel communication bus system as claimed in claim 3, characterized in that the fixed number of bits is three and in the initialisation program, after each generation and transmission of one of the plurality of different destination station addresses, when such generation and transmission is acknowledged by another station on the bus system, the variable part is incremented by one and to create a next one of the plurality of different destination station addresses, and initialisation is aborted upon generation and transmission and acknowledgment of all possible eight addresses in the variable part.

5. A single channel communication bus system as claimed in claim 2, wherein each of the plurality of destination addresses comprises a fixed part which depends on the type of station and a variable part which comprises a fixed number of bits.

6. The system of claim 1 wherein communication along the single channel bus is according to a D2B protocol.

7. A single channel communication bus system as claimed in claim 5, characterized in that the fixed number of bits is three and in the initialisation program, after each generation and transmission of one of the plurality of different destination station addresses, when such generation and transmission is acknowledged by another station on the bus system, the variable part is incremented by one to create a next one of the plurality of different destination station addresses, and initialisation is aborted upon generation and transmission and acknowledgment of all possible eight addresses in the variable part.

* * * * *